United States Patent
Albou et al.

(10) Patent No.: US 6,204,652 B1
(45) Date of Patent: Mar. 20, 2001

(54) VOLTAGE REGULATING SYSTEM FOR ELECTRICAL LOADS IN A MOTOR VEHICLE

(75) Inventors: Pierre Albou, Paris; Jean Paul Charret, Bobigny; Joel Leleve, Epinay S/Seine, all of (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/532,764

(22) Filed: Mar. 22, 2000

(30) Foreign Application Priority Data

Mar. 23, 1999 (FR) .................................................. 99 03576

(51) Int. Cl.[7] ....................................................... G05F 1/40
(52) U.S. Cl. ........................ 323/284; 327/214; 327/437; 327/484
(58) Field of Search ..................................... 323/282, 284, 323/224, 265, 223, 225, 259, 271, 268, 275, 285, 344, 350, 299, 300, 307; 307/40; 327/211, 214, 437, 484, 576

(56) References Cited

U.S. PATENT DOCUMENTS

| | | | |
|---|---|---|---|
| 4,902,958 | 2/1990 | Cook, II . | |
| 5,095,224 | * | 3/1992 | Renger ................................. 327/110 |
| 5,289,043 | * | 2/1994 | Marshall et al. ........................ 307/40 |
| 5,414,341 | | 5/1995 | Brown . |
| 5,627,460 | * | 5/1997 | Bazinet et al. ......................... 323/288 |
| 5,757,173 | * | 5/1998 | Agiman ................................. 323/282 |
| 5,808,455 | * | 9/1998 | Schwartz et al. ...................... 323/271 |
| 5,847,554 | * | 12/1998 | Wilcox et al. ......................... 323/282 |
| 5,870,296 | * | 2/1999 | Schaffer ................................. 323/282 |

FOREIGN PATENT DOCUMENTS 0 470 750   2/1992   (EP) .
2 707 021   12/1994   (FR) .

* cited by examiner

*Primary Examiner*—Peter S. Wong
*Assistant Examiner*—Gary L. Laxton
(74) *Attorney, Agent, or Firm*—Morgan & Finnegan, LLP

(57) ABSTRACT

A motor vehicle electrical system has at least one apparatus for regulating the power supply voltage of an electrical load which has a nominal or rated supply voltage. The regulating apparatus is supplied by a variable value unidirectional voltage source. The apparatus includes an oscillator for generating a rectangular control signal having a cyclic ratio which varies with the value of the unidirectional voltage when the latter is above a given threshold value. The apparatus also includes an interrupter controlled by the control signal and connected in series with the load across the voltage source. Each voltage regulating apparatus further includes an inductance connected in series with the load, and a component with unidirectional conduction in parallel with the series connected load and inductance.

7 Claims, 4 Drawing Sheets

VOLTAGE REGULATING SYSTEM FOR ELECTRICAL LOADS IN A MOTOR VEHICLE

FIELD OF THE INVENTION

The present invention relates to electrical power supply apparatus, especially for the supply of power to electrical equipment fitted in motor vehicles. The invention is applicable in particular, but without limitation, to power supply apparatus for lighting systems that include incandescent light sources or light sources of the light emitting diode type, or electrical systems which are sensitive to variations in the supply voltage.

BACKGROUND OF THE INVENTION

Such lighting systems are supplied from an onboard energy source which is typically the battery of the vehicle. Vehicle batteries used at the present time generally deliver a nominal voltage of around 12 volts. However, it is normal practice to find that there are over-voltages at the terminals of the items of equipment supplied by the battery. These over-voltages may be of short duration, and may not perturb the operation of the apparatus except over a time interval short enough to be acceptable.

However, over-voltages in the power supply network may often be prolonged, especially as a result of the discharge of capacitive elements, or because an alternator regulator is defective. In the absence of any additional regulation of voltage directly at the terminals of the apparatus, the disturbance to the operation of the latter will therefore persist.

In the case of headlights, such a prolonged over-voltage may typically reach 18 volts and can cause the light intensity emitted to be increased. This can infringe photometric regulations and cause dazzling, which is tiresome or even dangerous to drivers coming in the opposite direction.

The over-voltages can also be voluntary, because manufacturers sometimes increase the power distributed in the vehicle in order generally to compensate for the various voltage losses that are linked to the increasing number of items of electrical equipment mounted in a vehicle, such as electrical power assisted steering, electrically governed suspension systems, and so on. In this context, headlights are such that, under these circumstances, they will emit light of too high an intensity, which, apart from the dazzling effects already mentioned above, also involve a considerable shortening of the useful life of filament lamps in the headlights.

In addition, in order to solve the problem of the increase already mentioned above, in the power consumed by the various onboard electrical items of equipment, it has been arranged that the nominal supply voltage delivered by the battery of the vehicle should be substantially increased. Thus, some vehicles have batteries of 24 or 42 volts for example.

The use of existing apparatuses which do not have intermediate adjusting means for the voltage is then excluded, because the voltages delivered at the terminals of such apparatus is too different from the nominal voltage of each respective apparatus, which is of the order of 12 volts.

In the case of filament lamps, which are the type most often used in headlights, it is certainly possible to envisage that the lamps should have a supply voltage corresponding to the battery voltage of the vehicle, of 24 or 42 volts for example. However, the constraints imposed on design and manufacture of the filament (which has to have a very fine double coil so that it can be brought to incandescence, but which must also be quite strong so that it will not be damaged by the supply voltage) has made such lamps expensive and fragile. In addition, the filament of such a lamp is not well adapted to the photometric requirements imposed by certain so-called "free surface" reflectors.

Another solution would consist in the use of a second voltage source which is dedicated to the lighting system, or the use of a specific electrical network for lighting purposes, connected to the battery of the vehicle through a voltage reducer. However, this would involve major complexity and extended length in the wiring network of the vehicle, which is something manufacturers try to avoid, given the high costs involved in wiring.

One solution that can resolve the above mentioned drawbacks linked to persistent or permanent over-voltages or to an increase in the nominal voltages delivered by the vehicle battery, consists in associating with each lamp of a headlight or indicating signal display a voltage regulating apparatus which firstly reduces the voltage to the rated or nominal value of the headlight or indicating light in the case of general supply of the vehicle with a voltage greater than the rated voltage, and secondly, regulates the voltage so as to minimise fluctuations in the voltages that may occur across the lamp.

One such voltage regulating device has been described by the Company Valeo Vision in French patent specification No. FR 2 707 021. In the arrangement described in that document, a n electronic circuit modules the vehicle battery voltage and a periodic voltage with square wave pulses for supplying the lamps of the illumination equipment. The periods of the pulses of the supply voltage are so defined that there mean value is adjusted on a given rated value corresponding to the nominal power supply voltage of the lamps.

DISCUSSION OF THE INVENTION

An object of the present invention is to provide an improvement to this regulating apparatus, in which the current flowing in the load or loads remains essentially constant, so as, in particular, to increase the useful life of the loads and in particular incandescent lamps.

Another object of the invention is to provide a switching and regulating station the structure of which is simple and inexpensive.

According to the invention in a first aspect, apparatus for regulating the supply voltage for an electrical load having a nominal supply voltage, the apparatus being fed from a source of unidirectional voltage of variable value, the apparatus comprising an oscillator generating a rectangular control signal, the cyclic ratio of which varies with the value of the unidirectional voltage when the latter is greater than a given threshold voltage, and further including an interrupter controlled by the said control signal and connected in series with the load across the voltage source, the apparatus being characterised in that it further includes an inductance which is connected in series with the load and a component with unidirectional conduction, in parallel with the series-connected lamp and inductance.

Preferably, the unidirectional conduction component is a second controlled interrupter.

The two controlled interrupters are preferably subjected to the same control signal; they preferably consist of C-MOS transistors, with N channel and P channel respectively; and preferably, the two controlled interrupters are connected in series with the voltage source.

According to the invention in a second aspect, a system for generating the supply for loads mounted in a motor vehicle includes at least one apparatus according to the said first aspect of the invention, for regulating the supply voltage of an associated load.

The system preferably also includes a module for selectively controlling the supply of power to each regulating apparatus.

Preferably, it further includes a module for selectively controlling the power supply of each load by applying to each regulating apparatus an activating signal or a de-activating signal.

The control module preferably consists of a decoder for activating and de-activating signals carried on a common bus.

Preferably, the control module and the regulating apparatuses are part of a common electronic unit.

Further features of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
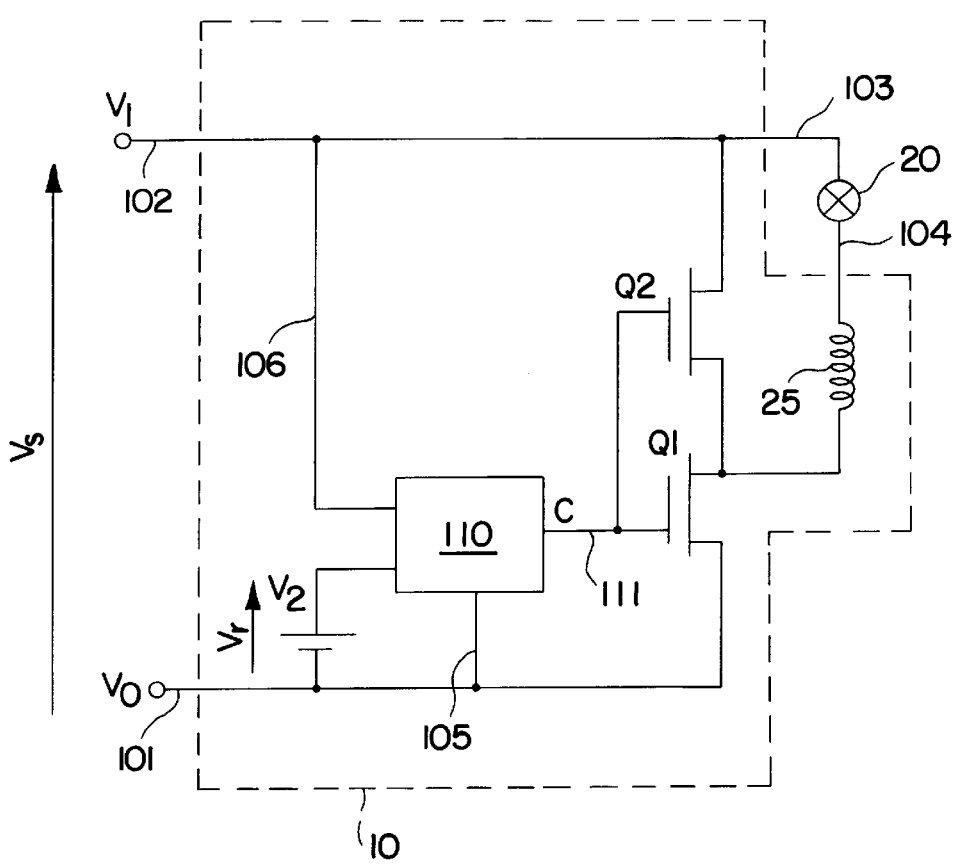
FIG. 1 is a diagram of a circuit according to the invention, for regulating the voltage delivered across an electrical load.

Reference is first made to FIG. 1, which shows an electronic regulating circuit 10 which is supplied from a voltage source Vs defined by the constant potentials V0 and V1, in which V1 is greater than V0. The circuit 10 is connected to these constant potentials by electrical conductors 101 and 102 respectively. The circuit is connected by means of conductors 103 and 104 across a load 20, which may for example be an incandescent lamp of a headlight or signal light of a motor vehicle.

The potentials V0 and V1 are defined on a power source carried on the vehicle, which may for example consist of the terminals of the battery of the vehicle. In that case the potential V0 is the ground or earth voltage of the vehicle, and the voltage Vs delivered by the battery may typically be 12 volts as is usual, although it may have a value of for example 24 or 42 volts, in order to reduce the supply current and therefore the cross section of the various connecting conductors, in particular where the vehicle has numerous items of electrical equipment.

The circuit 10 includes a control module 110 which is connected to the potentials V0 and V1 through the respective conductors 105 and 106. The module 110 is also connected to a source of a potential V2 which, with the potential V0, defines a reference voltage Vr=V2−V0. The module 110 is arranged to emit a control signal C on an output terminal 111.

The control module 110 includes a comparator circuit and an oscillating circuit which operate according to the following principle.

Figure 3A:
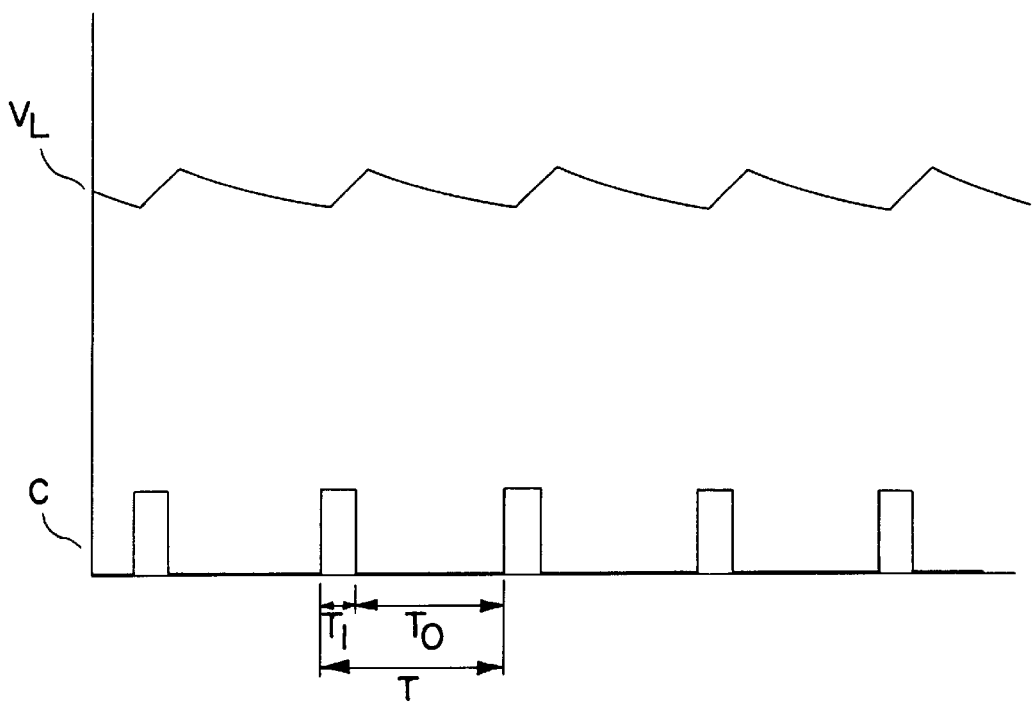
FIGS. 3a and 3b are graphs showing the appearance of a control signal generated by the circuit and the corresponding periodic voltage delivered across the load of FIG. 1.

If Vs is smaller than or equal to Vr, the module 110 delivers a control signal C which is equal to a fixed voltage very close to Vs, and which is said to be a high level control signal. If, now, Vs is greater than Vr, the module 110 passes to the conductor 111 a square-wave (or rectangular) control signal C having an unvarying period $T=(T_0+T_1)$ as shown in FIG. 3a. In this signal, one period T consists of a time interval $T_1$ during which the signal C is Vs (i.e. at the high level), followed by a period $T_0$ during which the signal C has a constant value close to zero volts, and is said to be a low level control signal.

Figure 2:
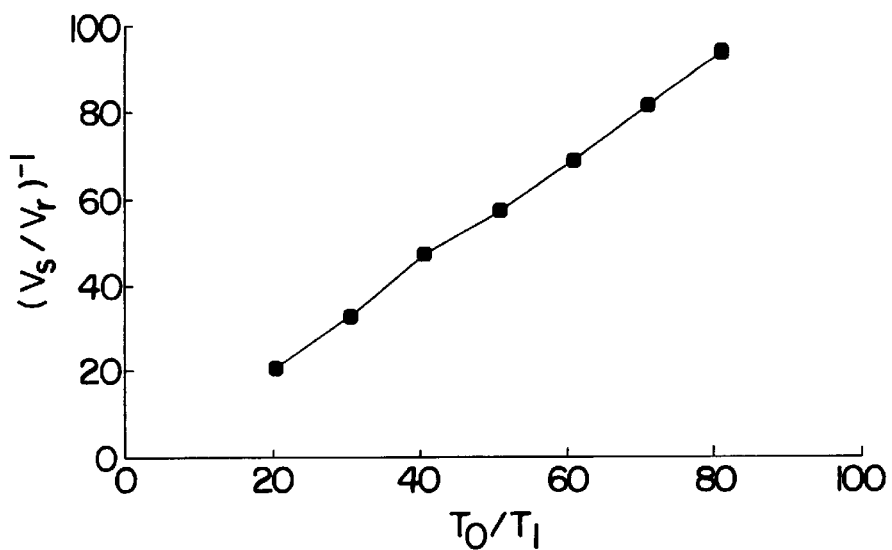
FIG. 2 is a graph showing the development of a characteristic ratio of the voltage delivered across the load in FIG. 1 as a function of the ratio between the supply voltage for the circuit of FIG. 1 and the rated voltage of the load.

The ratio $T_0/T_1$ of the control signal C is equal to 0 if Vs is greater than or equal to Vr. In that case the signal C is uniformly at its high level. The ratio $T_0/T_1$ is also substantially equal to $(Vs/Vr)-1$, as shown in FIG. 2, if Vs is greater than Vr. Reference should be made to French patent specification No. FR 2 707 021, in the name of the Company Valeo Vision, for more detail as regards the operation of the control module 110.

Figure 1A:
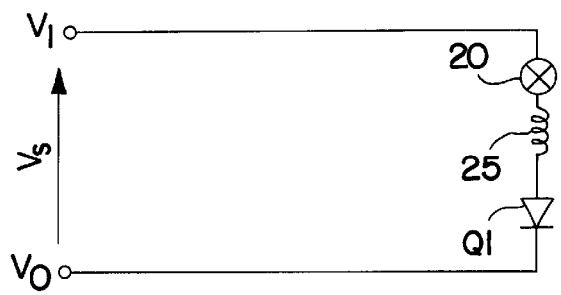
FIG. 1a is a diagram of a circuit equivalent to the circuit of FIG. 1, in a periodic operating mode of the circuit.

Referring once again to FIG. 1, the control signal C is passed to the grids of two C-MOS transistors Q1 and Q2, which are of N type channel and P type channel respectively, and which are connected in series between the potential V0 and the potential V1. The drains of the two field effect transistors Q1 and Q2 are directed to a first terminal of an inductance 25. The lamp 20 is connected through the conductors 103 and 104 between the potential V1 and the second terminal of the inductance 25. Thus, when Vs is greater than or equal to Vr, then the voltage of the signal C is at high level, and the transistor Q1 is passing, while the transistor Q2 is blocked. In this case, the circuit 10 is equivalent to the circuit shown in FIG. 1a, which applies across the lamp 20 and inductance 25 in series the voltage Vs reduced by the threshold voltage of the transistor Q1. Since this supply voltage is continuous, the impedance of the inductance 25 is low, and the voltage across the lamp 20 is substantially equal to the supply voltage Vs.

If, now, Vs is greater than Vr, the pulses of the signal C passed to the gates of the two transistors by the control module cause the periodic opening of one transistor while the other one is closed, and vice versa. An operating cycle of the circuit as shown in FIG. 3a therefore includes the following two steps.

During the period $T_1$ (with the signal C at high level), the transistor Q1 is passing and the transistor Q2 is blocked. The circuit is therefore, for this time period $T_1$, again equivalent to that in FIG. 1a, and the voltage $V_1$ across the lamp 20 increases in a non-linear manner while the impedance of the inductance 25 is reduced.

Figure 1B:
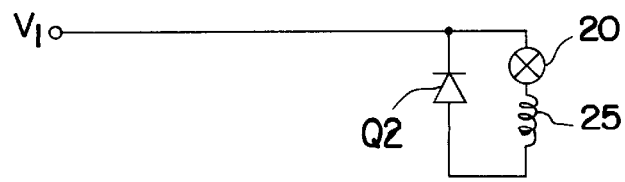
FIG. 1b is a diagram of an alternative circuit equivalent to the circuit of FIG. 1, again in a periodic operating mode.

When the control signal C passes to the low level (for the period $T_0$), it is the transistor Q2 that is passing while the transistor Q1 is blocked. The circuit 10 is then equivalent to that shown in FIG. 1b, in which the lamp 20, the inductance 25 and the transistor Q2 (which performs in a manner equivalent to that of a diode because it is passing though directional), are connected in series in a closed loop of the "free wheel" type in which the current flows so as to diminish progressively. The voltage Vl across the lamp 20 then decreases in a non-linear manner until it reaches its cycle starting value as indicated in FIG. 3b.

The duration of the pulses delivered by the control module 110 is, as has been said above, regulated in such a way that the cyclic ratio $T_0/T_1$ of the signal is substantially equal to (Vs/Vr−1) when Vs is greater than Vr. When the value of Vs increases, the duration of the high level voltage pulses delivered by the module 110 then diminishes (that is to say the duration $T_0$ increases while the duration $T_1$ diminishes), in such a way that the mean value over time of the voltage across the lamp remains substantially equal to the reference voltage Vr.

Figure 3B:
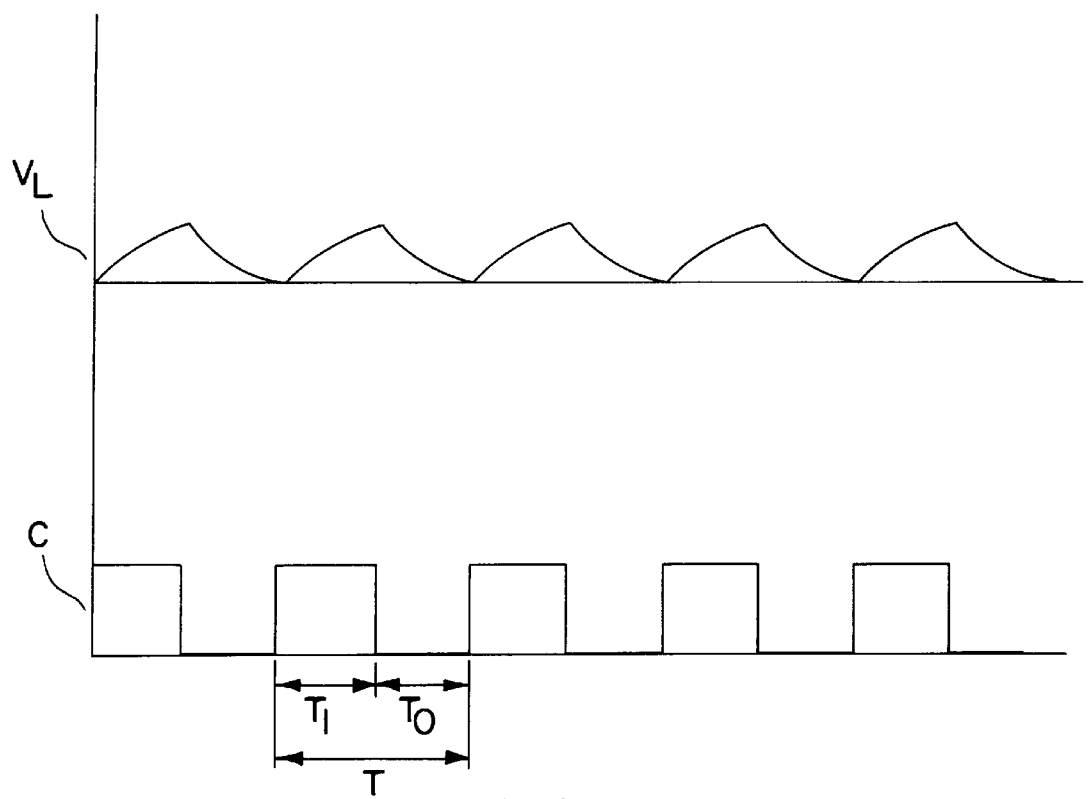

Reference is now made to FIG. 3b, in which the scale of the load voltage Vl is different from that of the same voltage in FIG. 3a. FIG. 3b illustrates the operation of the circuit when the value of the supply voltage Vs is diminishing, while remaining greater than the reference voltage Vr. In FIG. 3b, the durations of the periods $T_0$ and $T_1$ are substantially equal. In consequence, the voltage across the lamp 20 increases, in this example over a half period, and then decreases over the next following half period. The mean value of the load voltage Vl across the lamp then remains substantially equal to the value Vl in the case of FIG. 3a, because the increase in the time period $T_1$ compensates for the reduction in value of the supply voltage Vs in such a way that the product $T_1.Vs$ remains substantially equal to T.Vr.

Figure 4:
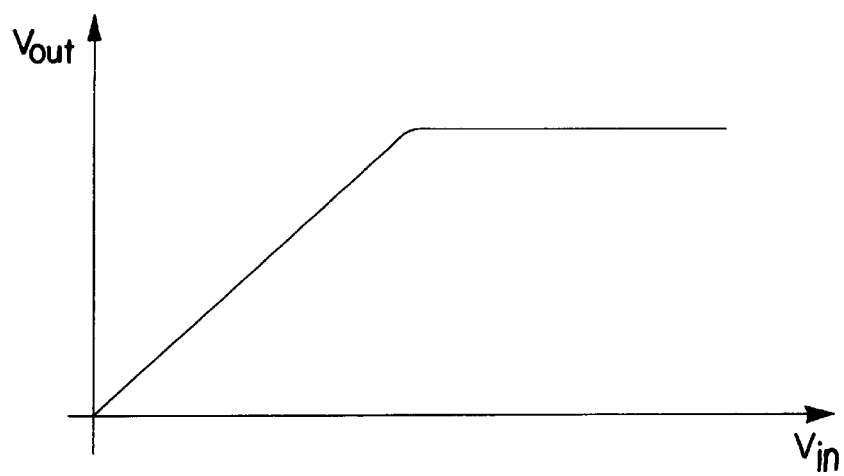
FIG. 4 is a graph of the voltage transfer function in the circuit of the invention.

Thus, once Vs is greater than Vr, the voltage across the lamp 20 is maintained at a mean value which is close to the reference voltage Vr. The value of this voltage is adjusted on the nominal supply voltage for the lamp 20. Development of the mean voltage across the lamp 20 as a function of the value of the supply voltage Vs is indicated diagrammatically in FIG. 4.

In order to avoid the situation in which an observer looking at the light which contains the lamp 20 is conscious of the variations of the light intensity produced by the lamp, the period $T=T_0+T_1$ of the control signals from the module 110 is adjusted to a value smaller than the duration of persistence of an image on the human retina, and for example the value to which it is adjusted may be equal to 0.03 second.

In addition, because of the inductance 25, the circuit enables the development of the voltage across the lamp to be smoothed, and this further stabilises the light intensity delivered by the latter. In this regard, the value of the inductance 25 is so chosen as to give such a smoothing effect without, however, excessively slowing up the increase in voltage to its nominal value during lighting of the lamp.

In another version of the circuit, which is not shown in the drawings, the transistor Q2 is replaced by a diode which is connected in parallel on the series connection of the lamp and inductance, with the diode enabling current to pass from the drain of the transistor Q1 to the potential V1. In this version, the general operation of the circuit is the same as that in the circuit of FIG. 1, although its overall output is slightly reduced by the power which is dissipated in the diode, the threshold voltage of which is of the order of 0.3 to 0.7 volts, while the threshold value of the C-MOS transistor may be of the order of 0.1 volts.

Figure 5:
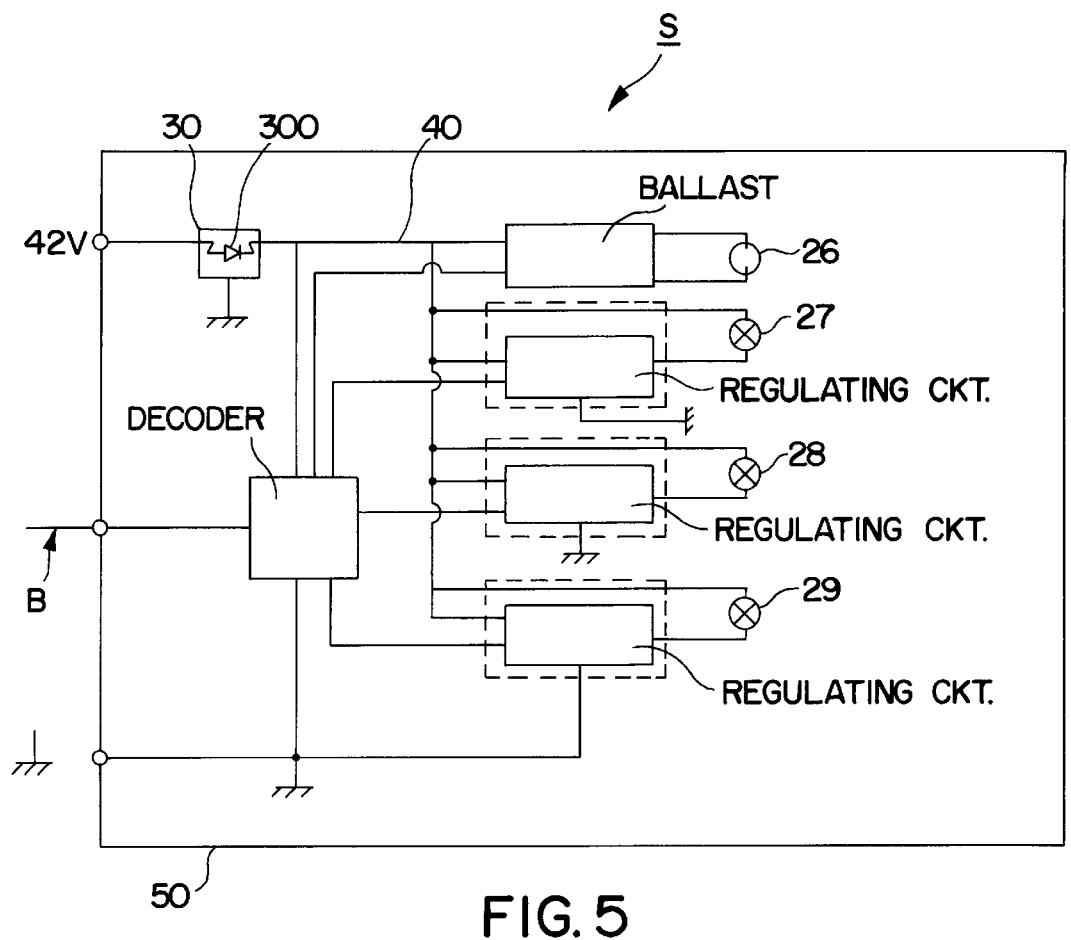
FIG. 5 is a diagram of an electrical generating device which uses the circuits according to the invention in a motor vehicle headlight having a plurality of light sources.

Reference is now made to FIG. 5, which shows an electrical generating system S which includes within an optical housing 50 of a motor vehicle four loads 26, 27, 28 and 29. These loads consist, respectively, of a discharge lamp of a short range headlight, and three filament lamps of a long range headlight, a foglight, and a flashing direction indicator. The three filament lamps 27, 2 and 29 are of conventional type, arranged to operate under a voltage of the order of 12 volts.

The housing also contains a decoder D which is connected to a bus B for transmission of multiplexed digital control signals, in a manner known per se. The use of such a bus, deployed within the vehicle close to electrical equipment of the vehicle for transmitting generating signals to them, is currently increasing as the number and sophistication of the different items of equipment increases.

The bus B is also connected to the terminals of a power supply source of the vehicle, which in this example is in the form of a 42 volt battery. A voltage regulating circuit, such as that described with reference to FIG. 1, and fed from the 42 volt source, is associated with each of the lamps 27, 28 and 29. The discharge lamp 26 is associated with a ballast 260 which is supplied directly with the voltage at 42 volts. The lamps 26, 27 and 28 are thus connected to the outputs of their respective regulating circuits 17, 18 and 19, which deliver to them a mean voltage which is substantially equal to their nominal voltage, with a typical value of 13.2 or 13.5 volts.

The regulating circuits 17, 18 and 19, and the ballast 260, are connected in series to a conductor 40 which is itself connected to the source of potential at 42 volts through a protection circuit 30, consisting in this example of a diode 300.

The ballast 260, and also the voltage regulating modules 17, 18 and 19, are also connected to the decoder D which controls their power supply and thus enables the driver of the vehicle to control the operation of the four loads of the headlight by controlling the digital signals transmitted on the bus B.

It will be observed here that, with this arrangement, the transistors Q1 and Q2 of the regulating circuits may be used for switching the lamps on and off, and therefore there is no need to provide any additional controlled interrupter. In this connection, the individual control signals delivered by the decoder D act in the circuits 17, 18 and 19 by a simple combination logic so as to enable their control module selectively to deliver the control signals or to prohibit them.

Circuits 17, 18 and 19 also include, in this embodiment, filtering and/or protective means of kinds that are normally incorporated in automotive electronic systems. In one advantageous modified embodiment, the system further includes diagnostic means for monitoring the state of the lamps.

It will also be noted that the fact that the protective device 30 is placed upstream of the circuits 17, 18 and 19, which reduces the value of the voltage, enables the current passing through the diode 300 to be substantially smaller than that which would flow in the part of the system situated downstream of the regulators, so that the overall output of the system is improved while the power dissipated in the diode by Joule effect is reduced.

It is further of advantage that the decoder circuit D and the regulator circuits 17, 18, 19, and also the auxiliary circuits associated with them (i.e. protective, filtering, diagnostic circuits and so on), may be grouped together within a common electronic unit which receives the battery voltage and the signals from the bus B, and which has as many outputs as there are electrical loads to control and energise.

The electronic generating system disclosed herein therefore enables lamps, or any other electrical loads which require the amount of fluctuation in the supply voltage to be small, to be supplied from a main power supply at a voltage which is generally higher than the rated voltage of the loads, without any significant additional wiring being required in the vehicle.

What is claimed is:

1. Regulating apparatus for regulating the supply voltage of an electrical load of nominal supply voltage, the apparatus being adapted for connection to a variable value unidirectional voltage source, and comprising:

an oscillator for generating a rectangular control signal having a cyclic ratio that varies with the value of the said unidirectional voltage when said unidirectional voltage is greater than a given threshold value;

a first controlled interrupter connected to the oscillator and controlled by the control signal, the first controlled interrupter being connected in series with the electrical load across the said variable value unidirectional voltage source, wherein the apparatus further includes an inductance connected in series with the electrical load, and a second controlled interrupter arranged for connection in parallel with the series mounted electrical load and inductance; and wherein the oscillator is connected with the first and second controlled interrupters for supplying a common control signal to the first and second controlled interrupter.

2. The apparatus according to claim 1, wherein the said first and second controlled interrupters are C-MOS transistors with N channel and P channel, respectively.

3. The apparatus according to claim 1, wherein the first and second controlled interrupters are connected in series with said variable value unidirectional voltage source.

4. A system for supplying power to electrical loads in a motor vehicle, including at least one regulating apparatus according to claim 1 for regulating the supply voltage of an associated load.

5. The system according to claim 4, further including a control module for selectively controlling the supply of power to each load by applying to the said at least one regulating apparatus an activating signal and a de-activating signal.

6. The system according to claim 5, wherein the control module comprises a decoder for decoding the activating signals and de-activating signals, the system including a common bus for carrying said activating signals and de-activating signals.

7. The system according to claim 5, comprising an electronic control unit, the said control unit including the control module and the said at least one regulating apparatus.

* * * * *